May 17, 1927.
L. I. HEINTZ
1,629,271
POST CONNECTION FOR VEHICLE BODIES
Filed Jan. 26, 1926
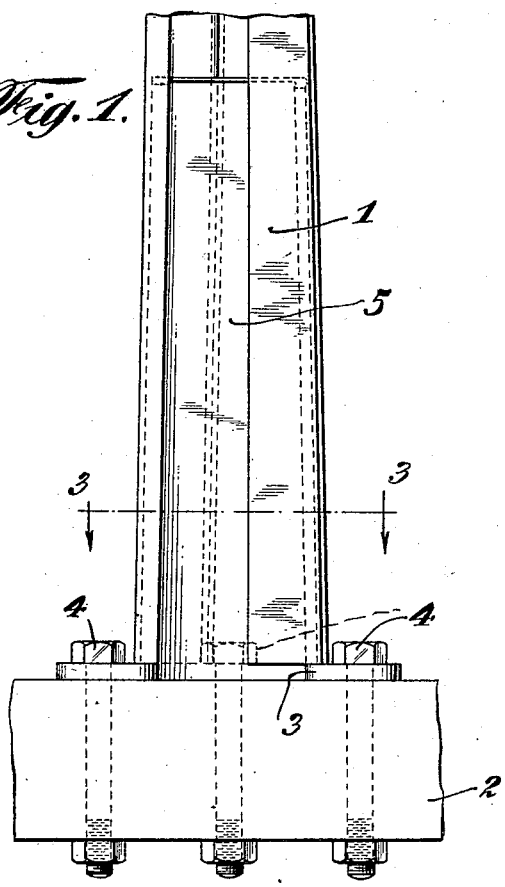
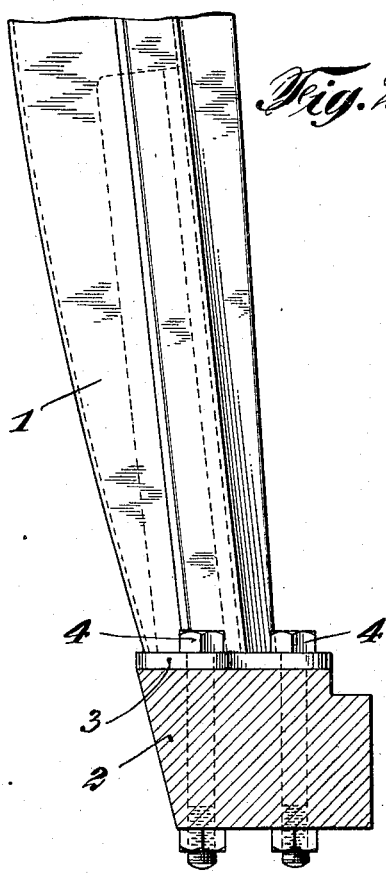
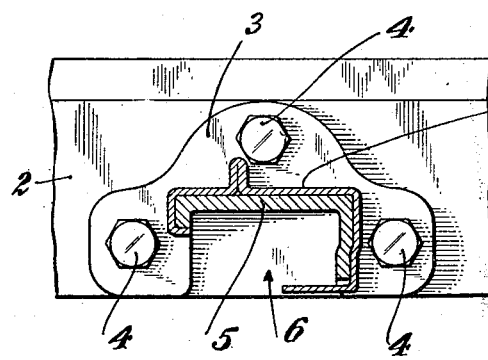
INVENTOR
Leo I. Heintz
BY
ATTORNEY Patented May 17, 1927.

1,629,271

UNITED STATES PATENT OFFICE.

LEO I. HEINTZ, OF PHILADELPHIA, PENNSYLVANIA, ASSIGNOR TO HEINTZ MANUFACTURING COMPANY, OF PHILADELPHIA, PENNSYLVANIA, A CORPORATION OF PENNSYLVANIA.

POST CONNECTION FOR VEHICLE BODIES.

Application filed January 26, 1926. Serial No. 83,954.

This invention relates to post connection for vehicle bodies, and more particularly relates to a bracket for attaching a sheet metal post to the sill or cross piece of a vehicle.

The principal aim of my invention is to provide a bracket of simple and inexpensive construction, whereby a sheet metal post may be secured very firmly and rigidly in place on a vehicle sill or cross piece, and to provide a bracket which reinforces the post, and a bracket which may be secured in place on the sill or cross piece and associated with the post very readily and easily. Other objects of this invention will be in part obvious and in part pointed out hereinafter.

This invention relates more especially to brackets suitable for sheet metal posts which are of box formation, or channel-shaped in cross-section. The bracket engages and reinforces the post on the inside, and has a base, whereby it may be secured to a cross sill, or the like, very readily and easily.

In order that a clearer understanding of my invention may be had, attention is hereby directed to the accompanying drawings, forming a part of this application and illustrating certain possible embodiments of my invention.

Referring to the drawings, Fig. 1 is a front view of a bracket embodying this invention, shown associated with the lower part of a post, and a fragment of a member on which the post and bracket are mounted; Fig. 2 is a side view of the same; and Fig. 3 is a sectional view of the same, and is taken on the line 3—3 of Fig. 1. Similar reference characters refer to similar parts throughout the several views of the drawings.

Referring to the drawings, 1 designates a sheet metal post of channel shape in cross-section, which is mounted on a frame member 2 by means of a bracket, which has a base or foot portion 3 secured to the frame member 2 by means of bolts 4, and has a vertical portion 5 fitting within the post 1 and shaped to seat snugly against the walls of the post on the inside. To this end, portion 5 is channel-shaped. To add rigidity, the bracket portion 5 and the post 1 are spot-welded together, the inner wall of the post being apertured, as at 6, to permit the insertion of the welding tool into engagement with the bracket portion 5.

Preferably, bracket 5 is secured to the bottom of the post before the post is mounted on the frame member. Then, to mount the post on the frame member, it is only necessary to place the post with its bracket thereon and bolt the bracket to the frame member. This secures an extremely rigid and durable post connection, which, however, is extremely light in weight in comparison with the strength of the connection. Bolts 4 are on three sides of portion 5.

As many changes could be made in the above construction and as many apparently widely different embodiments of this invention could be made without departing from the scope thereof, it is intended that all matter contained in the above description or shown in the accompanying drawings shall be interpreted as illustrated and not in a limiting sense.

What I claim is:—

A bracket of the character described, comprising a base portion and a portion extending at right angles to the plane of the base portion, said bracket consisting of an integral piece of sheet metal and said extending portion being channel-shaped in cross-section and having substantially straight, flat outside surfaces adapted to lie flat against the interior of a sheet metal post portion, fitted closely about the vertical portion and embracing the edges thereof.

This specification signed this 18th day of January, 1926.

LEO I. HEINTZ.